L. E. WATERMAN.
TRACTOR IMPLEMENT CONTROLLING MECHANISM.
APPLICATION FILED AUG. 24, 1914.
1,243,019.
Patented Oct. 16, 1917.
2 SHEETS—SHEET 1.
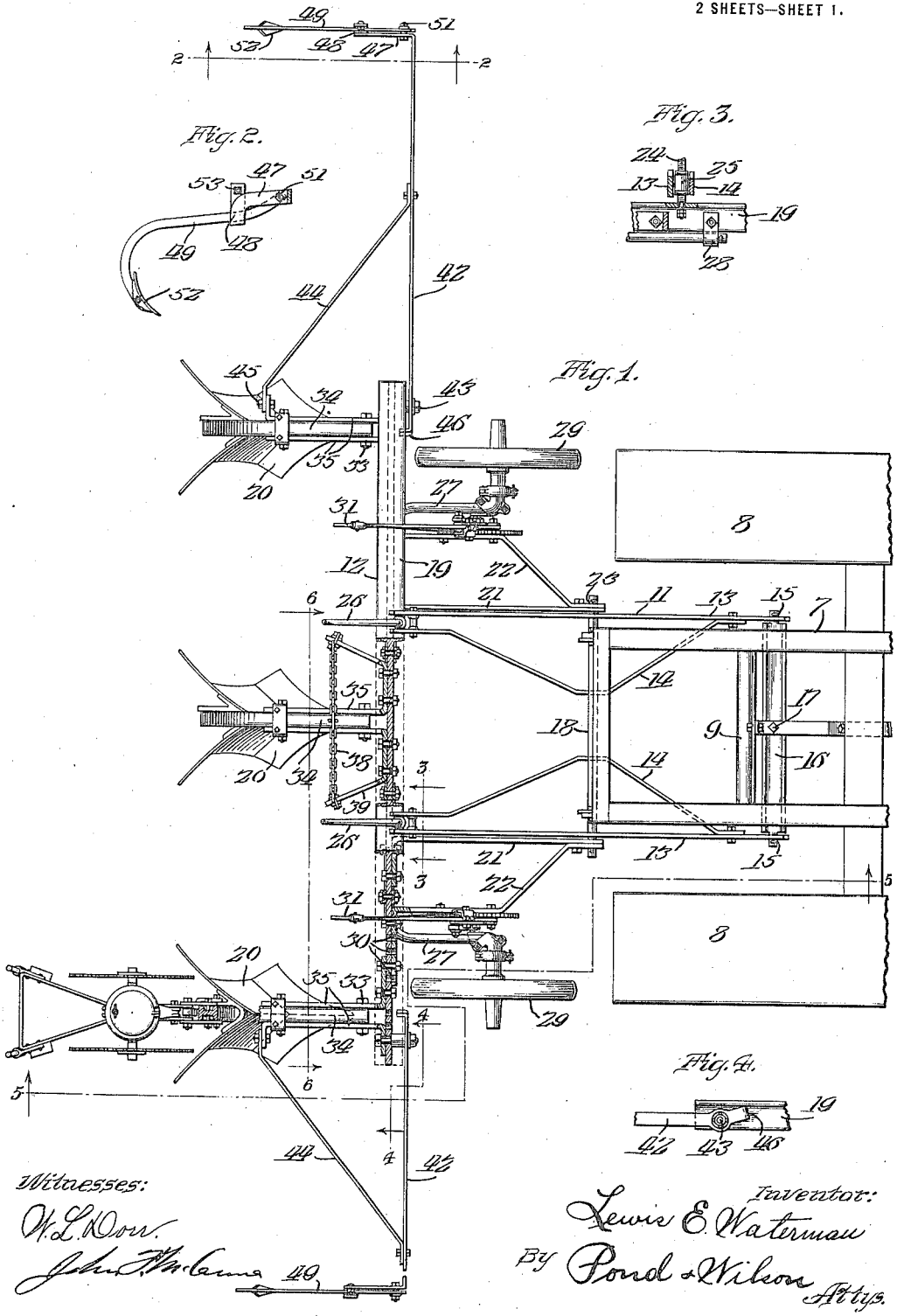

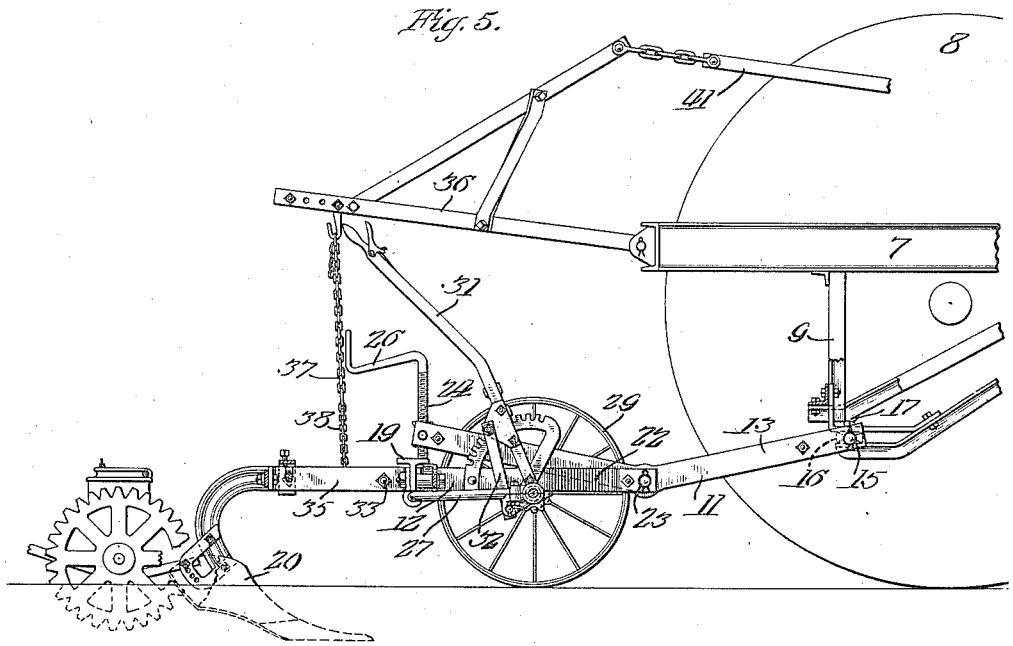
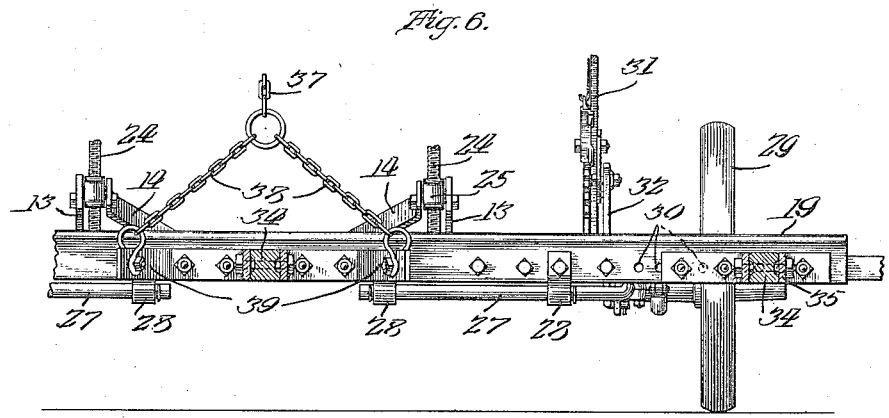

UNITED STATES PATENT OFFICE.

LEWIS E. WATERMAN, OF ROCKFORD, ILLINOIS, ASSIGNOR TO EMERSON-BRANT-INGHAM COMPANY, OF ROCKFORD, ILLINOIS, A CORPORATION OF ILLINOIS.

TRACTOR-IMPLEMENT-CONTROLLING MECHANISM.

1,243,019.     Specification of Letters Patent.     Patented Oct. 16, 1917.

Application filed August 24, 1914. Serial No. 858,338.

*To all whom it may concern:*

Be it known that I, LEWIS E. WATERMAN, a citizen of the United States, residing at Rockford, in the county of Winnebago and State of Illinois, have invented certain new and useful Improvements in Tractor-Implement-Controlling Mechanism, of which the following is a specification.

This invention relates or pertains in general to tractor-propelled implements, more particularly to those adapted to be hitched to the rear end of a tractor and to be lifted bodily from the ground to inoperative position, by power means carried by the tractor.

In my present invention, I aim, primarily, to provide an implement in the form of a lister designed to be drawn by a traction engine, and to be raised and lowered by power operated means mounted upon the tractor.

An object of my invention, also, is to provide a wheeled-frame for the lister means, adapted also to carry various earth-working tools or implements, particularly of the plow type, which will be simple and cheap to manufacture, and yet possess those qualities of strength and endurance necessary to devices of this kind.

Another object of my invention is to provide the implement frame with means for adjusting the working depth and the suction of the lister or plow means independently. This is necessary for proper working of the implements in all conditions of ground. As a means of attaining this object I have provided the implement-frame with supporting wheels mounted upon crank-axles which are adjustable vertically for changing the working depth of the plowing implements, and means embodied in the frame structure for angling the plow points to effect more or less suction. The latter adjustment is independent of the crank-axle adjustment, and both are independent of raising and lowering means carried by the tractor.

A further object is to provide a row-marking means particularly adapted to implements of the character of this invention.

Referring to the drawings:

Figure 1 is a plan view of a tractor implement embodying my invention, portions of the implement frame being shown in section.

Fig. 2 is a detail sectional view of the marker taken on the line 2—2 of Fig. 1.

Figs. 3 and 4 are detail sectional views taken on the lines 3—3 and 4—4, respectively, of Fig. 1.

Fig. 5 is a vertical sectional view taken on the line 5—5 of Fig. 1, showing substantially, a side elevation of the tractor implement; and Fig. 6 is an enlarged vertical sectional view taken on the line 6—6 of Fig. 1.

By reference to the drawings it will be noted that I have illustrated a traction engine diagrammatically, those elements shown comprising a main frame 7, driving wheels 8, and an underhung draft frame 9 suspended from the rear portion of the frame 7. To this underhung frame is connected the implement embodying my invention.

The earth-working tools or implements are carried by a wheel-supported frame which is pivotally connected at its forward end to the underhung frame 9 in such manner that the implement-frame may be swung laterally and vertically from its connection with the tractor, the lateral movement permitting flexibility in turning corners, and the vertical movement permitting the wheeled-frame to be raised bodily from the ground to inoperative position. The wheeled-frame comprises two frame structures, a draft-frame and an implement frame, designated generally by the reference characters 11 and 12, respectively. The draft-frame is formed of spaced side-bars 13 and brace-bars 14, the former being pivotally connected at their forward ends at 15 on horizontal axes to the ends of a draft bar 16 which is pivoted intermediate its ends on a vertical bolt 17, to the tractor. These frame bars converge downwardly toward their central portions, forming a lower portion intermediate their ends in which a transverse bar 18 is mounted, connecting the several frame bars.

The implement frame is constructed preferably of a T-beam 19 extending transversely of the draft-frame and beyond the sides thereof, and laterally spaced inner and outer side-bars 21 and 22, respectively, bolted at their rear ends to the forward side of the vertical section of the T-beam, extending forwardly therefrom in pairs, each pair being pivotally connected at 23 at its forward end upon the ends of the cross-bar 18. The rear end of the draft-frame is adjustably connected with the implement-frame through the intermediary of a pair of screwconnections, one at each side of the draft-frame, for the purpose of adjusting the frames relatively. These adjustable connections are substantially identical, and each comprises a screw-shaft 24 swivelingly connected to the cross of the T-beam, as clearly shown in Fig. 3, and a nut member 25 screw-mounted thereon, interposed between and trunnioned upon the rear ends of bars 13 and 14. Each screw-shaft is formed at its upper end with a hand-crank 26. By turning the hand-crank, it will be seen that the implement frame 12 may be either raised or lowered, about its fulcrum 23 on the draft-frame 11.

At each side portion of the implement-frame a crank-axle 27 is pivotally connected to the T-beam through straps or brackets 28 bolted to said beam, and carries its axle forward of said beam. Carrying-wheels 29 are mounted upon the crank-axles. Each crank-axle is capable of independent vertical adjustment by means of a hand-lever 31 pivotally mounted upon the side bar 22, and adapted to have a catch engagement with a toothed segment bracket attached to said side bar, a link 32 being pivotally connected at its opposite ends to the lever 31 and crank 27, whereby upon adjustment of the levers 31 the crank-axle will be moved vertically to effect raising and lowering of the wheeled-frame, about its fulcrum 15.

A plurality of lister plows 20 are connected to the implement frame, at the rear thereof, and in this instance, comprise a centrally arranged lister and two side listers. Each lister beam 34 is pivotally mounted at its forward end at 33 upon and interposed between a pair of bars 35 which have their ends turned at right angles and bolted to the vertical section of the T-beam as is clearly shown in section in Fig. 1. The rear ends of the lister beam 34 are capable of raising movement about their fulcrums 33 to permit them to avoid obstructions in their path which might injure the listers. The connection at the rear end of the lister beams with the side-bar 35 is preferably a slot and bolt connection commonly used and shown in section in Fig. 5. The listers are necessarily arranged in spaced relation as shown in the drawings, but the number of listers attached to the T-beam may be varied as occasion requires. I have shown auxiliary bolt holes 30, Figs. 1 and 6, to the position of which the outer listers may be laterally adjusted so as to operate in different widths of rows.

The wheeled-frame is raised bodily from the ground by means of a lever or boom structure 36 pivotally mounted upon the rear end of the tractor frame 7 and connected with the wheeled-frame through the intermediary of a chain 37, one end of which is connected to the lever and the other to chains 38 attached to bars 39 which are ends of bars 35 bent rearwardly, the lever 36 being operated through a link-connection 41 by any suitable power lifting means (not shown) mounted upon the tractor.

Each side of the implement frame is provided with row-marking means which are movable to operative and inoperative positions in a manner similar to marking means commonly used on various other implements. The marking means at each side of the frame are substantially identical in construction, and each comprises an outwardly extending arm 42 pivoted intermediate its ends at 43 to the vertical section of the T-beam, and braced by a bar 44 pivotally connected by a bolt 45 co-axial with the bolt 43, to an outer side-bar 35. The inner end of the arm is formed with a lateral extension 46 adapted to contact, as shown in Fig. 4, with the under side of the cross portion of the T-beam when the arm 42 is swung to a horizontally disposed position, to limit the lowered position of said arm. The outer end of the arm 42 is bent rearwardly at 47 at right angles to said arm, and then downwardly, and upwardly at 48, as shown in Figs. 1 and 2, to form guiding means for the marking member. The marker is in the form of a hook-shaped beam 49 interposed between the guide portions 48 of the arm and pivoted at 51 to the end section 47, and is provided at its marker end with a pointed shovel 52. From this construction it will be seen that the marker 49 has a vertical pivotal movement from its fulcrum 51, guided by the sides 48, and is limited in its upward movement by a bolt 53. When the arm is in its down or working position, with a marker resting upon the ground, the beam 49 thereof will be in its raised position limited by the bolt 53. It is obvious that the arms 42 may be swung into raised positions, and in such positions, would rest upon the raising means 36, although suitable stop means might be provided for limiting the inward movement of the arms 42.

The tractor implement as above described would be used for listing only. When it is desirable to perform listing and seeding operations simultaneously as is frequently done, seeding devices may be attached to the rear end of the lister plows, a suitable means of attachment being shown in Figs. 1 and 5.

The implement is shown in its operative position in Fig. 5, that is, with the lister plows in the ground, the working position of the listers being determined by the crank-axle and frame adjustments. For adjusting the working depth of the listers of plowing implements the levers 31 are operated, the adjustment being made through the crank-axles. When working in various fields having ground of different qualities, the suction of the plowing implements is affected and it is necessary to adjust the plowing implements independent of the adjustment for their working depth, to give them a proper working angle. This is attained by the adjustment of the hand-cranks 26, whereby the lister or plow points may be angled without materially changing the working depth thereof, to obtain greater or less suction. When it is desired to raise the lister or plow means from the ground, the lever or boom 36 would be raised by the tractor power means, thereby raising the wheel-supported frame bodily from the ground, swung from the fulcrum 15. It is obvious that when raising the frame in this manner, provision would be made for either raising the seeding means with the frame or disconnecting said means therefrom.

In the foregoing I have described and illustrated a practical embodiment of my invention, and it will be obvious that various changes and modifications in the details of construction may be resorted to without departing from the scope of the invention as set forth in the appended claims.

I claim as my invention:

1. The combination of a draft frame adapted to be so pivotally connected at its forward end to a tractor as to be capable of vertical swinging movement about its pivotal connection, an implement frame pivotally connected upon a horizontal pivot to the draft frame and equipped with earth-working implements which with the implement frame constitute a rigid structure vertically movable with respect to the draft frame about said horizontal pivot, means for varying the suction of the implements by adjusting the implement frame relatively to the draft frame about said horizontal pivot, and gage wheels vertically adjustable for controlling the working depth of the implements independently of the adjustment of said adjusting means.

2. In a tractor-propelled implement, the combination of draft means the forward end of which is so connected with a tractor as to permit said means to swing vertically and laterally relatively to the tractor, a transverse beam connected to the rear end of said draft means and including in its connection therewith means for vertically adjusting the beam relatively to the draft means, a plurality of earth-working implements rigidly connected to said transverse beam, gage wheels connected with said beam and vertically adjustable with respect thereto, and means on the tractor for raising the transverse beam and parts connected therewith as a unit, bodily from the ground.

3. In a tractor-propelled implement, the combination of a draft-bar pivotally mounted intermediate its ends on a vertical axis to a tractor-draft-frame, members pivotally connected at their forward ends on horizontal axes to the ends of said draft-bar, an implement-frame pivotally connected to the draft-frame on a horizontal axis, intermediate the ends of said draft-frame, means connecting the rear end of the draft-frame with the implement-frame for adjusting the latter vertically, the implement-frame being provided with portions extending laterally from each side of the draft-frame, a supporting-wheel mounted upon each side portion of the implement-frame, means for adjusting the supporting-wheels vertically, and earth working implements connected to the implement-frame.

LEWIS E. WATERMAN.

Witnesses:
G. R. MILLER,
L. A. GIFFEN.